United States Patent [19]

Jaroschek

[11] Patent Number: 5,090,886

[45] Date of Patent: Feb. 25, 1992

[54] APPARATUS FOR THE INJECTION MOLDING OF FLUID-FILLED PLASTIC BODIES

[75] Inventor: Christoph Jaroschek, Herbolzheim, Fed. Rep. of Germany

[73] Assignee: Klockner Ferromatik Desma GmbH, Malterdingen, Fed. Rep. of Germany

[21] Appl. No.: 586,528

[22] Filed: Sep. 21, 1990

Related U.S. Application Data

[62] Division of Ser. No. 511,764, Apr. 20, 1990.

[30] Foreign Application Priority Data

Apr. 21, 1989 [DE] Fed. Rep. of Germany ....... 3913109

[51] Int. Cl.$^5$ .............................................. B29C 45/16
[52] U.S. Cl. .................. 425/130; 264/328.8; 264/328.13; 264/572; 425/572; 425/588
[58] Field of Search ............... 425/130, 572, 588, 812; 264/85, 328.8, 328.12, 328.13, 500, 572

[56] References Cited

U.S. PATENT DOCUMENTS

| 4,029,454 | 6/1977 | Monnet .................. 425/812 |
| 4,101,617 | 7/1978 | Friederich ............... 264/572 |
| 4,909,725 | 3/1990 | Ward ....................... 425/588 |
| 4,923,666 | 5/1990 | Yamazaki et al. ..... 264/572 |

FOREIGN PATENT DOCUMENTS

| 2106546 | 8/1972 | Fed. Rep. of Germany ...... 264/572 |
| 2800482 | 5/1982 | Fed. Rep. of Germany . |
| 2139548 | 11/1986 | United Kingdom . |

*Primary Examiner*—Tim Heitbrink
*Attorney, Agent, or Firm*—Watson, Cole, Grindle & Watson

[57] ABSTRACT

A device for producing moldings of plastic material having a cavity therein filled with a fluid comprises a mold cavity, an injector for injecting flowable plastic into the mold cavity, an injector for injecting a pressurized fluid into an interior portion of the plastic, and a side cavity connected to the mold to receive flowable plastic melt expelled by the injected pressurized fluid. The side cavity may be randomly lockable and may comprise a closing stuffer which rests flush with respect to the mold cavity interior walls.

4 Claims, 3 Drawing Sheets

APPARATUS FOR THE INJECTION MOLDING OF FLUID-FILLED PLASTIC BODIES

This application is a divisional application of application Ser. No. 511,764, filed Apr. 20, 1990.

BACKGROUND OF THE INVENTION

1. Technical Field of the Invention

The present invention relates to a process for the injection molding of fluid-filled plastic bodies and an apparatus to carry out this process.

2. Discussion of the Related Art

A process of this kind is already known from West German patent application DE-05 21 06 546. In this process, a mold cavity for a shoe heel is formed by a two-part mold provided with an ejector punch. First, this cavity is filled partially with plastic melt by means of a nozzle attached to an injection unit to result in a flowable plastic melt. Next, a pressurized fluid—preferably compressed air—is blown by means of a second nozzle, arranged separately from the first, in such a manner into the fluid center of the plastic already located in the mold cavity that the plastic is pressed universally and uniformly against the walls of the mold cavity. The second nozzle is arranged in that half of the mold bearing it in such a manner that it is connected stationarily to it, always points in the direction of the opening and closing motion of the mold, and always attains the fluid center of the plastic when the mold is closed with its mold cavity-sided outlet. When the mold is opened, the opening left by the second nozzle in the shoe heel results in a pressure balance between the interior and exterior of the shoe heel. The goal of this process is to economize plastic material and thus minimize the weight of the final product without any impairment to the stability of the final product.

Another process of this kind is disclosed in U.S. Pat. No. 4,101,617, in which the flowable plastic melt and the pressurized fluid—for example air, carbon dioxide or nitrogen—is introduced into the mold cavity by means of a coaxial combination of nozzles This combination comprises a central nozzle having a circular cross section for the pressurized fluid and an annular nozzle which envelopes the central nozzle for the flowable plastic melt, both running into a joint opening in the mold. In one embodiment, only one part of the whole quantity of the plastic required for the final product is injected into the mold cavity and then the fluid is injected together with the rest of the required plastic. In another embodiment, the plastic and fluid are injected in separate stages. The disclosed result matches that of the aforementioned DE-05 21 06 546. The generated plastic hollow bodies are, for example, double windows, transparent hollow bricks, double walled lighting fixtures and double walled boarder lights. The pressure between the interior and exterior of the plastic hollow bodies is equalized by withdrawing the coaxial combination of nozzles from the opening of the mold before the mold is opened to remove the final product Alternatively, the pressure is equalized by sealing the gas inlet opening of the hollow body after the body is formed and cooled by pushing a plug-forming quantity of plastic in and boring or piercing the finished hollow body after the mold has been partially or totally opened. The mold cavity can be designed either as unchangeable during the injection molding cycle or as variable during such a cycle by means of at least one suitable lifting punch in the mold.

A process that is similar to the one above is also known from the West German publication DE-PS 28 00 482. This process has the major difference of using a viscous liquid rather than a gas as the fluid to produce a cavity in a plastic hollow body.

Another process of this kind is known from British patent GB-PS 2 139 548, in which a fluid is blown by means of one or more nozzles, which are separated from the nozzle which injects the flowable plastic melt, into the plasticized plastic flowing into the mold cavity. The fluid nozzle or nozzles empties or empty into a runner in the mold and/or also at a suitable point or at suitable points in the actual mold cavity. After the plastic body has cooled in the mold cavity and before the mold is opened, the pressure between the interior—comprising, if the occasion arises, several individual cells—of this plastic body and its exterior is equalized by means of the nozzle(s) installed to introduce the fluid.

In each of these aforementioned processes, only as much plasticized plastic as is necessary to shape the final product is injected into the mold cavity and the fluid must be blown in, whether this blowing takes place simultaneously with the introduction of the flowable plastic melt or later, so long as the flowable plastic melt exhibits initial signs of cooling on the parts of the mold surface with the melt has already made contact. Evidently, in the case of geometrically simple bodies this does not lead to difficulties when fabricating final products with repeatably uniform quality However, in the case of geometrically complicated bodies with different cross sectional areas vertical to the flow direction of the flowable plastic melt in the mold cavity, for example, in the case of a plate provided with hollow reinforcing ribs on one side, different effects which prevent manufacture of final products with repeatably uniform quality can be expected with the aforementioned methods.

It is to be expected that the flowable plastic melt in the mold cavity, both before and during the blowing of a fluid, flows faster into regions whose cross sections are larger than into regions whose cross sections are smaller and that this effect occurs to a greater degree when a fluid is blown in. Thus, when a fluid is blown in, the flowable plastic melts flows generally into regions whose cross section are greater not only before but rather simultaneously sideways into the adjacent regions whose cross sections are smaller; and in the extreme case a partial reversal in the flow direction of the flowable plastic melt can occur upon reaching the outer wall in conjunction with a break through of the fluid through the outer skin of the plastic body In any event, disturbing flow marks are produced on the surface of the final product. Only in very special individual cases can this be avoided by fixing the filling picture beforehand, i.e., chronologically changing the behavior of the flow front of the flowable melt and taking the picture into consideration when constructing the mold and, thus, the mold cavity for the geometrically complicated final product.

In addition, for a plastic body with a largely solid construction and only a few, relatively narrow fluid-filled cavities, such a pressure or follow-up pressure must be generated in the entire mold cavity just by means of the pressure of the fluid in these cavities and of the plastic material to be forced out of the cavities so that, following cooling, the fluid-filled plastic body exhibits no sink marks on its surface. This, too, can be achieved only in special individual cases when the fluid is prevented from simultaneously breaking through the outer skin of the final product or at least weak points are prevented from occurring in the fabricated parts.

In addition, in the case of final products whose cross sections vary widely or which have special shapes such as curved pipes, only in individual cases can it be repeatedly predetermined what the temperature gradient will be at every individual injection molding cycle, e.g., at a specific cross section through the mold cavity during the simultaneous formation of the wall of the still flowable plastic body and its fluid-filled cavity. However, the actual position of the cavity cross section in the body cross section, for example that of the pipe interior within the pipe body in the region of the pipe curvature, is predefined since the longitudinal axis of a cavity under discussion agrees in essence with the line of the respectively highest temperature of the flowable plastic melt in the flow direction, provided that additional influences of friction and current mechanics do not also have to be considered. A curved pipe manufactured by one of the aforementioned methods can thus exhibit in a cross section in the region of the pipe curvature from one injection molding cycle to another different positions of the pipe inner wall relative to the axis of the pipe and the automatically rotationally symmetrical pipe outer wall and thus have a different wall thickness up to the break-through on the periphery of the pipe.

Therefore, it is an object of the present invention to provide a process and a suitable device to carry out the process wherein fluid-filled plastic bodies having a complicated geometric shape can also be manufactured while avoiding the aforementioned drawbacks and having a faultless surface, in particular without flow marks apart from eventually provided inlet and outlet openings or their subsequent seals.

It is a further object to manufacture bodies having a few, relatively narrow fluid-filled cavities in a largely solid plastic body which show no sink marks in the surface.

Also, it is yet another object to enclose the fluid-filled cavities at predetermined points within the plastic body and with essentially repeatable volume.

Further objects and advantages are apparent from the specification and drawing which follow.

SUMMARY OF THE INVENTION

A special advantage of this invention lies in the fact that to manufacture fluid-filled plastic bodies it provides first of all that the mold cavity in he mold is completely filled with pressurized flowable plastic melt and does not provide that the melted center of such a plastic body be expelled by means of a fluid that is also pressurized until the surface of the plastic body that rests against the mold has already cooled so that, except for eventually provided inlet or outlet openings or their subsequent seals, this surface is produced repeatably without any faults from the start.

Another significant advantage of the invention lies in the fact it does not rule out any point of the mold cavity for the attachment of one or more pairs of nozzles to blow in the fluid and of outlets, connected to side cavities, for the fluid so that with any shape of plastic body regardless of geometrical complexity Each side cavity is constructed so that after filling a side cavity with a part of the melted center of a plastic body and after the cooling and solidification of this plastic melt, the side cavity can be cleared of this solidified plastic material, or the expelled melted plastic can be used again for the next cycle (in the case of using the injection unit, the injection nozzle and the runner as a side cavity, as discussed below). Each pair of nozzles comprises a fluid blowing nozzle and an associated fluid outlet which can be constructed into a side cavity in order to blow out areas of the body having larger cross sections with fluid. In this process it can also be advantageous for a single nozzle with several outlet openings or even a single outlet opening with several nozzles to interact in pairs.

Another advantage of the invention lies in the fact that at least in special cases it also permits the use of the interior of the configuration(s) of a runner, a nozzle to inject the plastic melt and an associated injection unit as an appropriate side cavity to receive the blown out fluid center of the plastic body when the piston or the screw which works like a piston and belongs to the injection unit is withdrawn in time. In this process the expulsion can be conducted in an advantageous manner such that the portion of the expelled melted center seals every gate opening in such a manner that the wall thickness of the plastic body is not reduced. The remainder of the expelled melted center can be used in the next cycle.

In addition, it has also proven to be advantageous within the scope of the invention that, instead of or in addition to the use of the interior of one or more configurations comprising a runner, a nozzle to inject plastic melt and an associated injection unit as side cavity(ies), the interior of one cavity or several cavities arranged outside the mold cavity in the mold but connected to the mold cavity is used as an appropriate side cavity or cavities, wherein each of these connections is equipped with means to arbitrarily open and close these connections. In this manner the flexibility with respect to the aforementioned possibilities of arbitrarily adapting pairs of fluid blowing nozzles and fluid outlet openings in the mold cavity is significantly facilitated and at the same time care is taken that with simple and readily controllable means the surface of the plastic body can be built up, its melted center can be blown out and the terminating plug-like outlet opening(s) can be sealed with the remainder of the melted center.

The embodiments and the manner in which the subject matter of the invention functions are explained in detail with respect to the following drawings and detailed description.

DETAILED DESCRIPTION OF THE PREFERRED EMBODIMENTS

Figure 1:
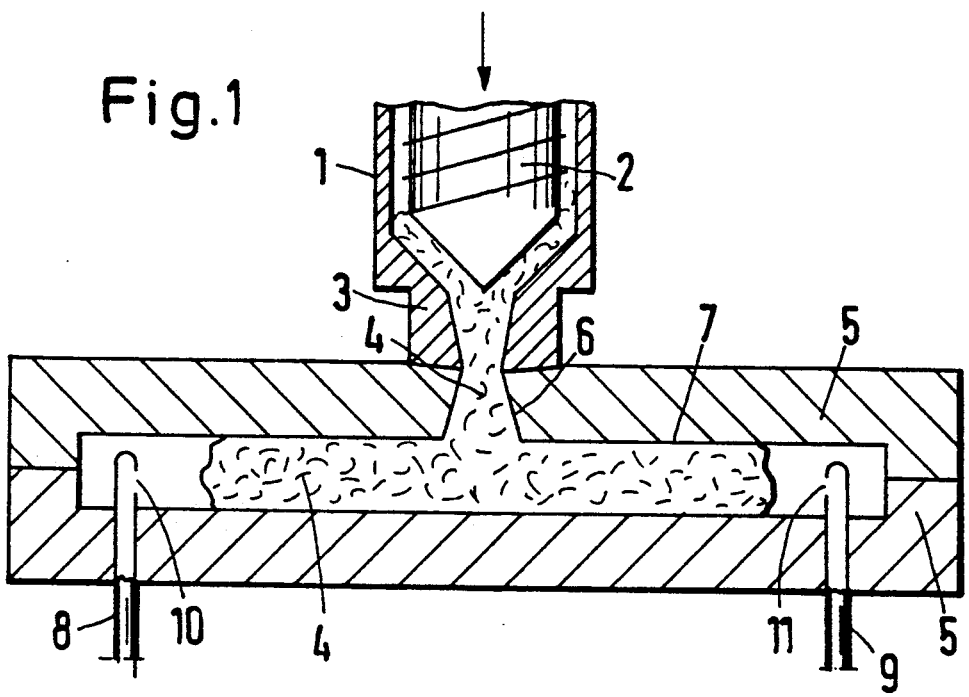
FIG. 1 is a sectional view of an injection molding machine, which is illustrated schematically during a complete filling of the mold cavity with flowable plastic melt.

FIG. 1 is a schematic drawing of an injection molding machine of the invention with an injection unit 1 (which is only shown as a fragment) in which an extruder screw 2 is provided to generate significant changes in pressure by a piston-like motion in the axial direction in addition to rotational motion A nozzle 3 is provided to inject a flowable plastic melt 4. A multi-part mold 5 is also provided which in the illustrated case has two parts and has a runner 6 and a mold cavity 7 defined by the mold walls. In addition, the mold 5 is equipped with additional nozzles 8, 9 to inject a fluid into the mold cavity 7 which is completely filled beforehand with free-flowing plastic melt 4. These nozzles 8, 9 can be connected in the conventional manner either stationarily to a part of the tool or can be moved with respect to the part of the tool and in this embodiment are located a maximum distance from plastic melt nozzle 3.

FIG. 1 shows the injection molding machine in a stage in which the mold cavity 7 has not yet been completely filled with flowable plastic melt 4, a state which is indicated by the arrow marking the direction of the axial motion of the extruder screw 2. The nozzles 8, 9 which inject a fluid, for example compressed air, compressed nitrogen, or a pressurized suitable liquid, are not yet enveloped by the plastic melt 4. In the nozzles a fluid pressure, which just compensates for the pressure in the mold cavity 7 in the region of the nozzle openings 10, 11, is maintained in this stage.

Figure 2:
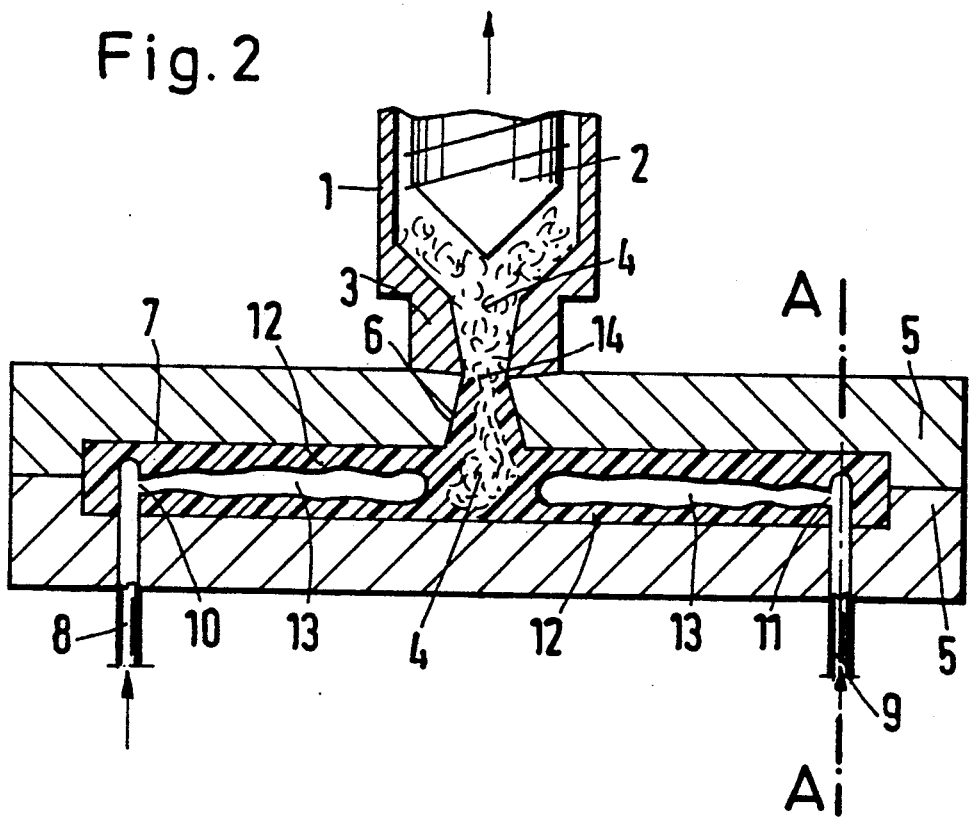
FIG. 2 is a sectional view of the injection molding machine of FIG. 1 following cooling of the surface of the plastic body and during the expulsion of the melted center of the plastic body into a side cavity, formed by the interior of the runner, the nozzle and the injection unit.

FIG. 2 shows the injection molding machine of FIG. 1 at a later point in an injection molding cycle in which the mold cavity 7 had already been completely filled with flowable plastic melt 4 and the surface 12 of the plastic melt 4 resting against the walls of the mold cavity 7 has already set after cooling. At this point in time, on the one hand, a pressurized fluid 13 is injected through the nozzles 8, 9 into the flowable plastic melt 4 which has not set yet, i.e., in the melted center of the resulting plastic body, as indicated with the arrows under nozzles 8, 9. On the other hand, at the same time the extruder screw 2 is pulled away from the mold 5 as indicated by the arrow to increase an effective volume so that the interior of the runner 6, nozzle 3 and injection unit 1 forms a side cavity 14, which lies outside the mold cavity 7 but is connected to it, to receive the expelled free-flowing plastic melt 4. Each side cavity is constructed so that after filling a side cavity with a part of a melted center of a plastic body and after cooling and solidification of this plastic melt, the side cavity can be cleared of this solidified plastic material, or the expelled melted plastic can be used again for the next cycle (in the case of using the injection unit, the injection nozzle and the runner as a side cavity). Thus, the injection and expelling of the plastic melt occurs in substantially opposite directions in this embodiment.

The injection of the fluid 13 is not terminated until a portion of the plastic melt 4 interior to be expelled forms a plug in front of the runner 6 having the same wall thickness as the cooled surface 12. The plug supplements the cooled surface 12 which is already present in its vicinity within the mold cavity 7 to form a plastic body with a smooth and continuous outer surface without any reduction in wall thickness. The runner 6 can have a cross sectional area which is adapted for the dual function of a gate and an expulsion opening and accordingly may be larger than a conventional runner which only functions as a gate. After the final setting of the plastic body that is produced and prior to opening the mold, the pressure between the fluid-filled interior of the plastic body and the atmosphere can be balanced, for example, by means of one or both of the nozzles 8, 9. The remainder of the expelled plastic melt which does not form the plug is available for the next molding cycle.

Figure 3:
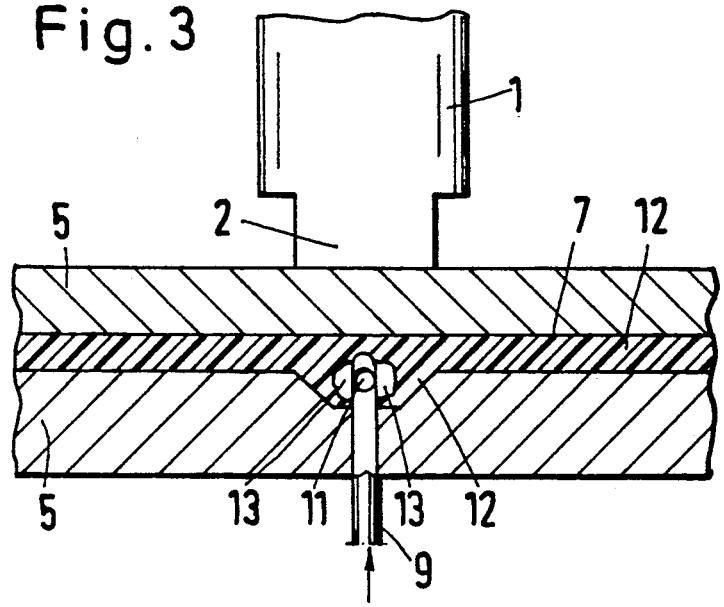
FIG. 3 is a sectional view taken along line A—A of FIG. 2.

FIG. 3 shows a sectional view taken along line A—A of FIG. 2, which assumes that the plastic body to be produced is a plate-like structure with reinforcing ribs, wherein the ribs are designed as hollow ribs. In accordance with the invention, it does not matter at this point whether the body has a rectangular shape with parallel running reinforcing ribs or a round or oval shape with radially running ribs. In particular, it should also be recognized here, in addition to FIG. 2, that in the case of complicated geometric shapes there exists the possibility of being able to define very accurately by means of the process and apparatus of the invention selected regions of a plastic body that can be produced in order to fill it with a pressurized fluid.

Figure 4:
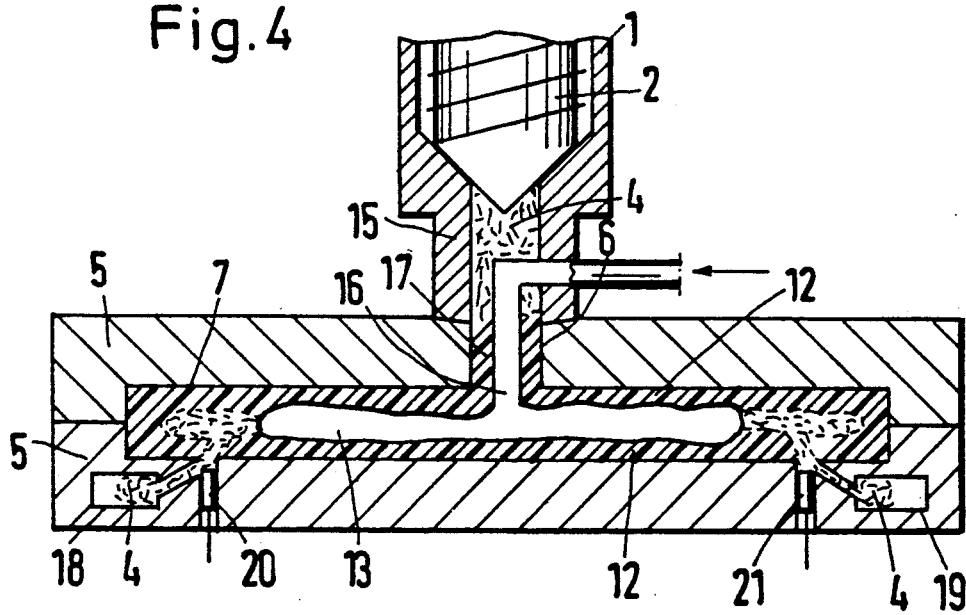
FIG. 4 is a sectional view of an injection molding machine of the invention shown schematically in which the fluid expels the melted center of the plastic body by means of a nozzle which is arranged concentrically in a nozzle to inject the plastic melt into separate, side cavities that are connected to the mold cavity.

FIG. 4 shows another embodiment of an injection molding machine of the invention in a stage corresponding to that of FIG. 2 in which the flowable plastic melt 4 and the pressurized fluid 13 are injected one after another by means of a coaxial nozzle 15 having an inner nozzle 16 having a circular cross section to inject the pressurized fluid 13 and an outer annular nozzle 17 to inject the free-flowing plastic melt 4 into the mold cavity 7. Following the injection of the flowable plastic melt 4, the extruder screw 2 remains inoperative in its foremost position; the still flowable plastic melt 4 of the malted center of the plastic body is expelled into the demoldable side cavities 18, 19, which are arranged outside the mold cavity 7 and connected thereto and whose connections to the mold cavity 7 can be opened and closed by means of stuffers 20, 21 that can be actuated between open and closed positions. The side cavities 18, 19 are located at a maximum distance from coaxial nozzle 15 in accordance with requirements imposed on the shape of the resulting plastic body. Thus, the injection and expulsion of the plastic melt occurs in substantially the same direction. Following the expulsion of the still flowable plastic melt 4, the side cavities 18, 19 can be closed in time and in such a manner that the rest of the plastic melt forms a plug which aligns with the set surface 12 of the plastic body over the stuffers 20, 21 and whose height corresponds to at least the wall thickness of the already formed set surface 12 of the plastic body.

Figure 5:
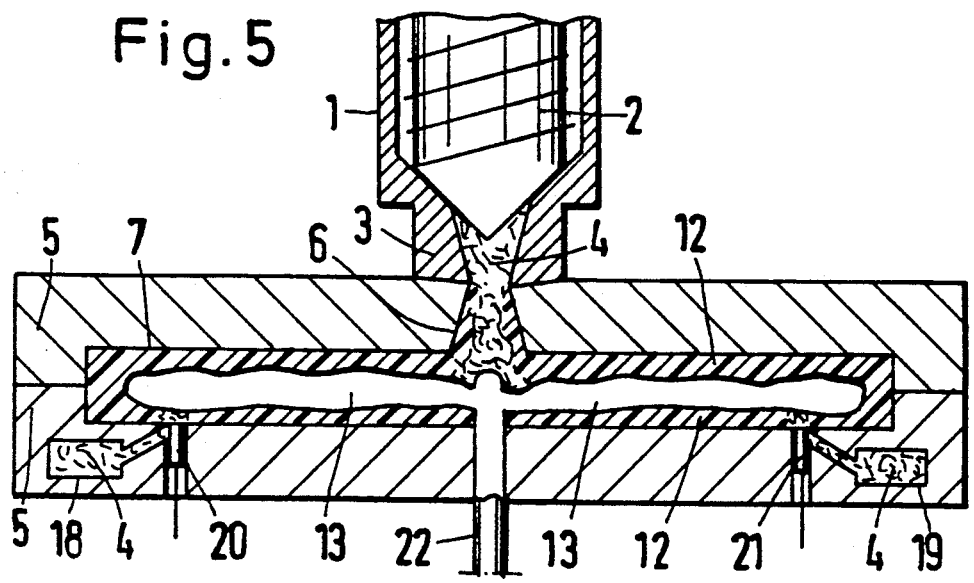
FIG. 5 is a sectional view of a schematically illustrated injection molding machine of the invention in which the fluid has expelled the melted center of the plastic body by means of a single nozzle to inject the fluid into several separate, side cavities connected to the mold cavity.

FIG. 5 shows another embodiment of an injection molding machine of the invention, which differs significantly from the above embodiments in that the still flowable plastic melt 4 is expelled with a single nozzle 22 separated from the plastic injecting nozzle 3. Nozzle 22 is aligned with plastic melt nozzle 3 to inject pressurized fluid in the horizontal direction of the plastic melt and is located at an opposite mold wall from nozzle 3. Nozzle 22 injects the pressurized fluid 13 into several side cavities 18, 19 located at a maximum distance from the oppositely arranged nozzles in accordance with the requirements imposed on the shape of the plastic body. In this figure a stage of an injection molding cycle is shown in which the expulsion of the still flowable plastic melt 4 from the melted center of the plastic body has just terminated. The stuffers 20, 21 are moved into a closing position that aligns with the surface of the mold cavity 7. With the remainder of the plastic melt 4, a plug, whose height corresponds to the wall thickness of the set surface 12 of the plastic body that envelops the plug, is produced above each stuffer 20, 21.

Figure 6:
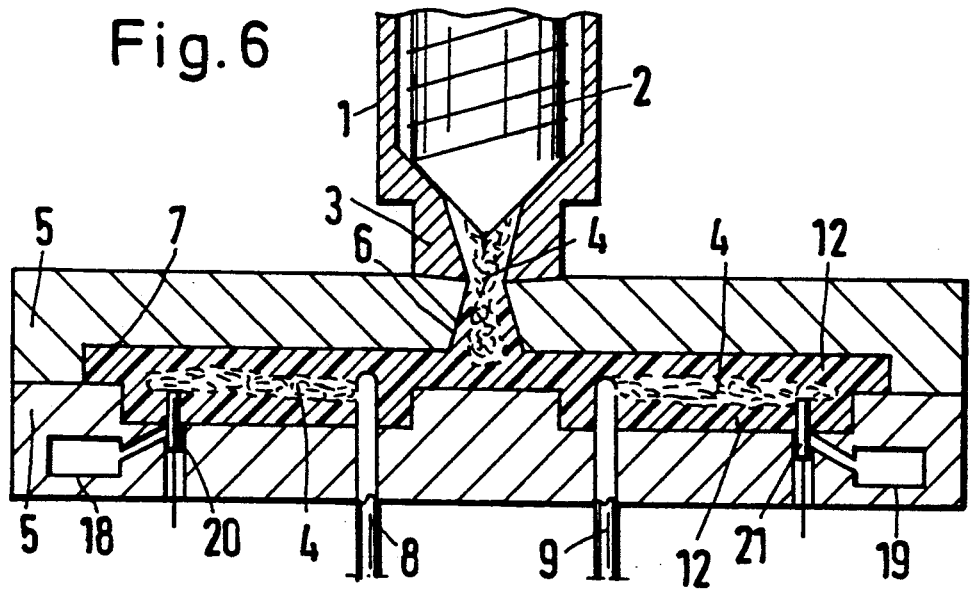
FIG. 6 is a sectional view of a schematically illustrated injection molding machine of the invention in which the fluid will expel the melted center of the plastic body by means of several pairs of elements, each pair comprising a nozzle to inject the fluid and an associated side cavity comprising several defined subregions of the plastic body.

In contrast, FIG. 6 shows an embodiment which uses several pairs of nozzles 8, 9 to inject the pressurized fluid 13 and uses associated side cavities 18, 19 to provide only individual regions of a plastic body, for example interrupted reinforcing ribs at a plate-shaped structure, in a selected manner with an inner filling of pressurized fluid 13. The nozzles 8, 9 are located near nozzle 3 and direct the pressurized fluid toward associated side cavities 18, 19 located at a maximum distance from the plastic melt nozzle 3 in accordance with geometric considerations of the desired plastic body. The injection molding machine is shown in a stage of an injection molding cycle in which the setting of the surface 12 of the plastic body has advanced to such a degree that the still flowable plastic melt 4 is about to be directly expelled into the side cavities 18, 19. The stuffers 20, 21 are still positioned in such a manner in the mold cavity 7 so that they extend into the mold, are enclosed by already set material of the surface 12 and, upon release of the connections from the mold cavity 7 to the side cavities 18, 19, produce defined openings in the set surface 12. The pressure of the fluid in the nozzles 8, 9 compensates just the pressure in the mold cavity 7 in front of the nozzle openings. Following the end of the expulsion phase and the complete cooling of the fluid-filled plastic body and prior to the opening of the mold 5, here, as in all of the preceding cases, the pressure between the fluid-filled interior of the plastic body and the atmosphere can be balanced, for example, via the nozzles 8, 9 to inject the pressurized fluid and, if desired, a material exchange with the atmosphere effected.

In the preceding embodiments, pressurized fluid nozzles 8, 9 and 22 may be designed driven in order to advance into and retract out of the mold cavity with respect to a cavity wall and therefore be positionable to effect proper formation of plastic body. By retracting the fluid nozzle out of mold cavity 7, a direct channel to the atmosphere is formed to equalize pressure. This pressure equalization can also be accomplished by means of a suitable change-over valve of conventional type located in the supply line to one of the pressurized fluid nozzles.

Many modifications and improvements will be apparent to one skilled in the art without departing from the scope of the present invention as defined in the following claims.

We claim:

1. An injection molding device having a mold cavity defined by movable walls, the device comprising:
    means for injecting pressurized flowable plastic melt into the mold cavity to completely fill the mold cavity;
    means for injecting pressurized gas into an interior of the plastic melt after a part of the plastic melt has cooled along the walls of the mold cavity;
    at least one side cavity arranged outside of the mold cavity and in communication with the mold cavity to receive flowable plastic melt expelled by the injected pressurized gas; and
    means for opening and closing the communication between said at least one side cavity and the mold cavity, wherein said opening and closing means comprises a stuffer having an end which aligns with a wall of the mold cavity which is in communication with said at least one side cavity when said stuffer is in a closed state.

2. An injection molding device having a mold cavity defined by movable walls, the device comprising:
    means for injecting pressurized flowable plastic melt into the mold cavity to completely fill the mold cavity;
    means for injecting pressurized gas into an interior of the plastic melt after a part of the plastic melt has cooled along the walls of the mold cavity;
    at least one side cavity arranged outside of the mold cavity and in communication with the mold cavity to receive flowable plastic melt expelled by the injected pressurized gas; and
    means for opening and closing the communication between said at least one side cavity and the mold cavity, wherein said opening and closing means comprises a stuffer having an end which extends into the mold cavity when said stuffer is in a closed state.

3. An injection molding device having a mold cavity defined by movable walls, the device comprising:
    means for injecting pressurized flowable plastic melt into the mold cavity to completely fill the mold cavity, said injecting means for said pressurized flowable plastic melt comprising a nozzle, an injection unit, and an associated runner located between the nozzle and the mold cavity;
    means for injecting pressurized gas into an interior of the plastic melt after a part of the plastic melt has cooled along the walls of the mold cavity;
    at least one side cavity arranged outside of the mold cavity and in communication with the mold cavity to receive flowable plastic melt expelled by the injected pressurized gas, said at least one side cavity comprising an interior portion of the nozzle, an interior portion of the injection unit, and the associated runner; and
    means for opening and closing a communication between at least one other side cavity and the mold cavity, wherein said opening and closing means comprises a stuffer having an end which aligns with a wall of the mold cavity which is in communication with said at least one other side cavity when said stuffer is in a closed state.

4. An injection molding device having a mold cavity defined by movable walls, the device comprising:
    means for injecting pressurized flowable plastic melt into the mold cavity to completely fill the mold cavity, said injecting means for said pressurized flowable plastic melt comprising a nozzle, an injection unit, and an associated runner located between the nozzle and the mold cavity;

means for injecting pressurized gas into an interior of the plastic melt after a part of the plastic melt has cooled along the walls of the mold cavity;

at least one side cavity arranged outside of the mold cavity and in communication with the mold cavity to receive flowable plastic melt expelled by the injected pressurized gas, said at least one side cavity comprising an interior portion of the nozzle, an interior portion of the injection unit, and the associated runner; and means for opening and closing a communication between at least one other side cavity and the mold cavity, wherein said opening and closing means comprises a stuffer having an end which extends into the interior of the mold cavity when said stuffer is in a closed state.

* * * * *